(No Model.)
S. B. STINE & J. V. SMITH.
COAL MINING MACHINE.
No. 343,346. Patented June 8, 1886.
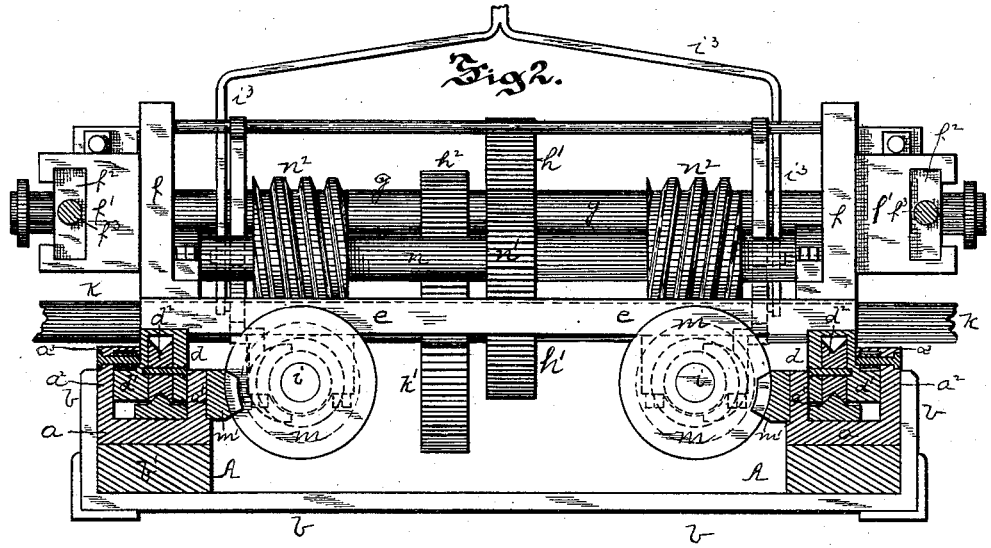
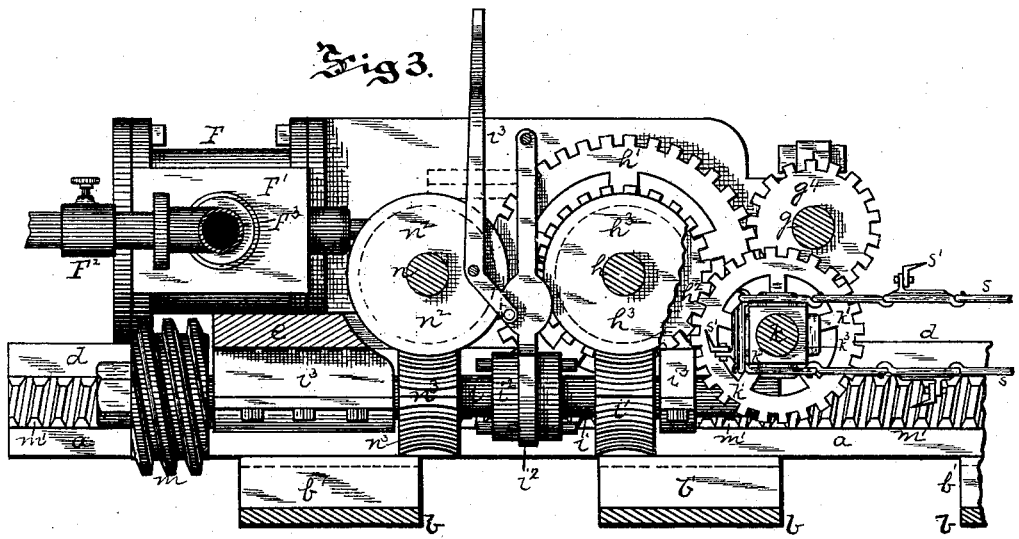
Witnesses:
Inventors.
Samuel B. Stine
James V. Smith
By James F. Ray
Attorney (No Model.) 3 Sheets—Sheet 3.

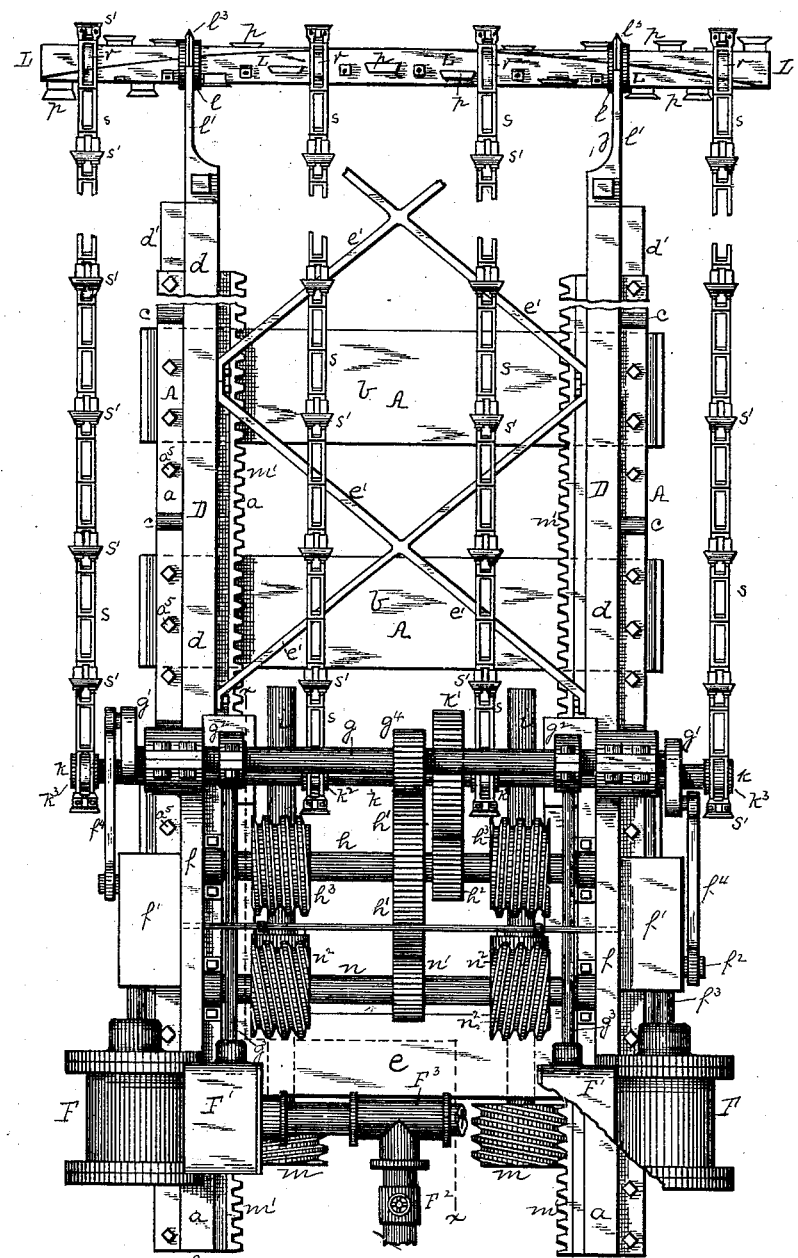

S. B. STINE & J. V. SMITH.
COAL MINING MACHINE.

No. 343,346. Patented June 8, 1886.

Witnesses: Inventors.

UNITED STATES PATENT OFFICE.

SAMUEL B. STINE AND JAMES V. SMITH, OF OSCEOLA MILLS, PA.

COAL-MINING MACHINE.

SPECIFICATION forming part of Letters Patent No. 343,346, dated June 8, 1886.

Application filed July 11, 1885. Serial No. 171,269. (No model.)

*To all whom it may concern:*

Be it known that we, SAMUEL B. STINE and JAMES V. SMITH, of Osceola Mills, in the county of Clearfield and State of Pennsylvania, have invented a new and useful Improvement in Coal-Mining Machines; and we do hereby declare the following to be a full, clear, and exact description thereof.

Our invention relates to mining-machines, having special reference to that class of machines which are employed in coal-mines for channeling or undercutting the vein of coal in order to facilitate the removal of the same, the coal being thus undercut and subsequently blasted down or "dropped" by drilling at the top of the vein and blasting.

The object of our invention is to provide a simple and efficient machine for this purpose; and it consists, first, in certain improvements in the construction of the stationary bed and the traveling carriage, on which is mounted the rotating cutter bar or tool, and in the means of mounting the traveling carriage in the stationary bed, whereby friction is overcome and the apparatus operates with less power; second, in certain improvements in the apparatus for feeding out the traveling carriage during the undercutting operation, and withdrawing the same after the cut is made; third, in certain improvements in the cutter bar or tool, whereby it is caused to force the dust or cuttings from the center toward the sides of the machine, thus facilitating the removal of the same; fourth, in certain improvements in the manner of journaling or mounting this cutter-tool on the traveling carriage; fifth, in the means of rotating the cutter-tool, whereby strains on the same are overcome and the necessity of separate cleaner-chains is done away with; and, lastly, in certain details of construction, hereinafter specifically set forth.

Figure 4:
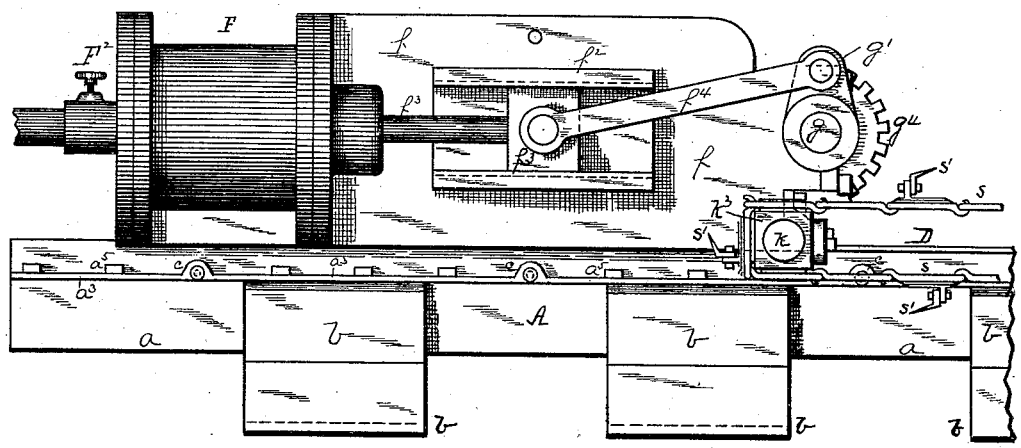
Figures 6, 7:
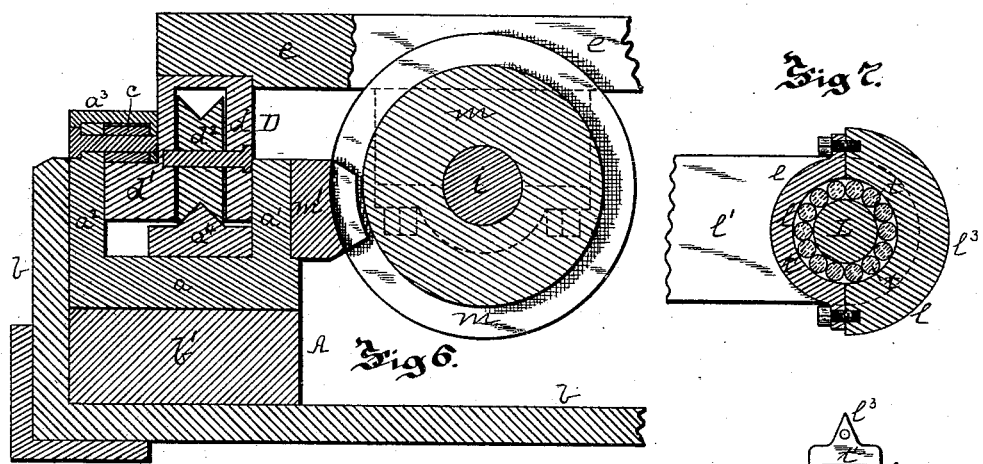
Figures 5, 8:
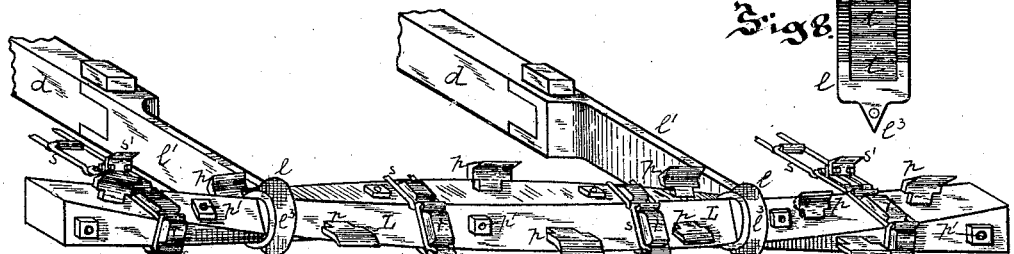

To enable others skilled in the art to make and use our invention, we will describe the construction and operation of the same, in which Figure 1 is a plan view of our improved mining-machine. Fig. 2 is a rear view, partly broken away, of the same. Fig. 3 is a longitudinal section of a portion of the machine on the line $x$ $x$, Fig. 1. Fig. 4 is a side view of a portion of the machine. Fig. 5 is a perspective view of the cutter-shaft and end of the traveling carriage; and Figs. 6, 7, and 8 are enlarged detail views illustrating the construction of the machine.

The stationary bed A is formed of the two side portions, $a$, secured to the cross-braces $b$, which are securely bolted thereto, and so form a rigid and strong bed, the stationary frame resting on these cross braces, several of which braces are employed at sufficient intervals to impart the necessary strength and rigidity to the frame.

In order to raise the bed a sufficent distance above the ground, blocks $b'$ are employed between the base of the side portions, $a$, and the braces $b$. The side portions, $a$, are cast to shape, and have the upright plates $a'$ $a^2$, the outer plate, $a^2$, having the horizontal plate $a^3$ extending inwardly therefrom, this plate $a^3$ being bolted to the plate $a'$ by bolts $a^5$, and in this horizontal plate are secured at suitable intervals idle-rollers $c$, these idler-rollers pressing against a portion of the traveling carriage, as hereinafter described, and so preventing friction between the carriage and the upper portion of this stationary bed.

Between the upright plates $a'$ $a^2$ on the bed is the track $a^4$, this track having a V-shaped rail, or rail of equivalent shape, on which travels a correspondingly-formed anti-friction roller in the carriage.

The traveling carriage D is provided with the bars $d$, which fit into the longitudinal seats formed for their reception in the stationary bed, between the upright plates $a'$ $a^2$ thereof, these bars $d$ having the extensions or side bars, $d'$, running along the outer side thereof, which side bars fit under the horizontal plates $a^3$ of the stationary bed, and press upwardly against the friction-rollers $c$, secured therein. These side bars, $d$, are provided at suitable intervals with the anti-friction rollers $d^2$, which are mounted in slots within the bars $d$, and which run on the V-shaped or similarly-shaped tracks $a^4$ of the bed, the rollers $d^2$ corresponding in shape to these tracks and so supporting the traveling carriage on the stationary bed, friction between the bars of the carriage and stationary bed being overcome by the rollers $c$ in the bed and the rollers $d^2$ in the carriage, as the rollers $d^2$ support the carriage on the track $a^4$, and any upward pressure of the carriage comes against the rollers $c$ in the bed, which bear against the side bars, $d'$, of the frame.

At the rear portion of the carriage D the bars $d$ thereof are connected by the bed-plate $e$ thereof, which is bolted to the top thereof, and on which is supported the engines and operative machinery by which the carriage is advanced and retracted and the cutter bar or tool rotated, and the forward portion of the carriage is connected by suitable diagonally-extending brace-rods, $e'$, extending across between the bars $d\ d$.

Extending up from each side of the bed-plate are the upright frames $f$, to which the cylinders F of the engines are secured, these cylinders having at the side thereof the valve-boxes F', and on the outer side of the frames $f$ are the guides $f'$, in which the slides $f^2$, connected to the piston-rods $f^3$ of the engine, move, the pitmen $f^4$ of the engines being connected to the slides and to cranks $g'$ of the engine-shaft $g$, which is journaled in boxes at the ends of the frames $f$. On said engine-shaft $g$ are mounted the eccentrics $g^2$, the eccentric-rods $g^3$ extending back along the inner side of the frames $f$ to the valve-boxes F'.

The engines are preferably operated by compressed air, this being found the best means of operating these mining-machines, the air being conducted through suitable pipes and hose to the valve F$^2$, and through the pipe F$^3$ to the valve-boxes F'. The engines are arranged to operate in such manner as to overcome the dead-points in their strokes, so that fly-wheels are not necessary.

Mounted on the engine shaft $g$ is the pinion $g^4$, which gears into the gear-wheel $h'$ on the intermediate or feed shaft, $h$, and on the shaft $h$ is mounted the pinion $h^2$, which gears into the gear-wheel $k'$ on the driving-shaft $k$, from which power is communicated to the cutter bar or tool L by means of chains. The intermediate shaft has secured thereto the single-thread screw or worms $h^3$, by means of which the apparatus for feeding forward the carriage is operated, these screws $h^3$ meshing into the screw-gears $i'$ on the longitudinal shafts $i$, these screw-gears $i'$ running loosely on their respective shafts, and being connected thereto by means of the sliding clutch $i^2$ on that shaft, the clutches being operated by suitable levers, $i^3$. The longitudinal shafts $i$ extend longitudinally below the bed-plate $e$, along each side of the apparatus near the side portions, $a$, of the stationary bed A, being mounted in suitable journal-bearings, $i^3$, and carrying at their rear ends the double-thread screws or worms $m$, these screws or worms meshing with the screw-racks $m'$, secured to the upright plates $a'$ of the side portions, $a$, of the stationary bed, these screw-racks extending along the inner faces of the side portions, $a$, of the stationary bed for the entire length of the bed, and the carriage being fed forward and back by means of these worm-wheels $m$ meshing into the screw-racks $m'$.

Mounted on the same horizontal plane as the intermediate or feed shaft, $h$, is the "recede-shaft" $n$, this recede-shaft carrying the pinion $n'$, which gears with the gear-wheel $h'$ on the intermediate shaft, and secured to said shaft $n$ are the double-thread screws or worms $n^2$, these screws meshing into the screw-gears $n^3$, mounted loosely on the longitudinal shaft $i$, and the screw-gears $n^3$ being caused to engage with said shaft by means of the clutch $i^2$, before referred to. As the shaft $n$ is turned in the opposite direction from the shaft $h$ through the gear-wheel $h'$ and pinion $n'$, and the threads on the screw-wheels $h^3$ and $n^3$ run in the same direction, it is evident that the screw-gears $i'$ and $n^3$ are turned in opposite directions, so that the direction of movement of the longitudinal shafts $i$ is reversed according to the screw-gear $h^3$ or $n^3$, with which the clutches $i^2$ engage, either set of screws and screw-gear being employed to cause the feeding forward or withdrawal of the apparatus, according to the desired operation of the machine.

When it is desired to feed forward the machine, the clutch is thrown into connection with the screw-gears $i'$, and the power of the engine is communicated through the engine-shaft $g$, through the pinions $g^4$ and $h'$, to the feed-shaft $h$, thence through the screws $h^3$ and screw-gears $i'$ to the longitudinal shafts $i$, and thence through the double-thread screws $m$ to the rack $m'$ on the stationary bed, thus causing the forward movement of the carriage; and when it is desired to withdraw the carriage the clutches $i^2$ are thrown into connection with the screw-gears $n^3$, and the power is then communicated from the engine-shaft $g$, through the pinion $g^4$, gear-wheel $h'$, and the pinion $n'$, to the recede-shaft $n$, and thence through the double-thread screws $n^2$ and screw-gears $n^3$ to the longitudinal shafts $i$, thus turning the longitudinal shafts in the opposite direction, and through the screws $m$, meshing with the screw-racks $m'$, drawing back the sliding frame. The forward movement of the machine is exceedingly slow, as the feed-shaft $h$ is turned more slowly than the recede-shaft $n$, and the screws $h^3$ have but a slight pitch, the pitch of said screws being less than one-half that of the screws $n^2$, so that an exceedingly slow but powerful forward feed of the traveling carriage is obtained. As, however, the shaft $n$ is turned at about the same speed as the engine-shaft $g$, and much more rapidly than the feed-shaft $h$, and the screws and gears are double-threaded screws with a deep pitch, it is evident that all speed necessary for the quick withdrawal of the carriage is obtained.

Mounted at the forward end of the carriage is the cutter bar or tool L, which is formed of a rectangular bar carrying a series of cutters and mounted in suitable bearings, $l$, these bearings being supported on suitable brackets, $l'$, extending out beyond the end of the bars $d$ of the sliding frame. The bearings $l$ may have any suitable form of bushing to support the cutter-bar, but the form preferred is that of a box having a suitable recess, within which are placed idle-rolls $t$ to overcome the friction of the bar, the body of the bar where it is supported in these bearings being formed cylindrical, and the bearings being of sufficient width to give proper support to the cutter-bar. The construction of these bearings is fully shown in Figs. 7 and 8, the annular recess $t'$, for the reception of the rollers $t$, being formed in each half of the bearing $l$, and a sufficient number of these rollers being employed to fill this recess around the cylindrical portion of the cutter-shaft.

It is found that by the employment of the anti-friction rollers in the bearing friction in the bearing is reduced to a minimum. It is evident that the brackets $l'$ cannot well be made as thick as the bearings, as this would leave too heavy a body of coal to be broken away by the bearings, and consequently the brackets are made wide and thin, as shown, so that the knives or chisels on the cutter-bar can be brought close to each other at the bearings, and so leave a very thin body of coal opposite the bearings, which can be easily broken away by the knife or chisel-points $l^3$ at the forward end of the bearings. In the machine as constructed the brackets $l'$ are not over one inch in thickness, sufficient strength for the brackets being obtained by their width, the brackets being formed the full width of the bearings, while the bearings extend out on each side of the brackets about one inch, thus giving a bearing of about three inches, which is sufficient for the purpose. The cutter-bar L is preferably twisted, as shown—that is, the rectangular bar is given a twist from the center backward in each direction toward the ends of about one-quarter turn, the purpose of this being to cause the knives or cutters on the bar which extend out from the flat faces of the bar to force the cuttings from the center toward the sides of the machine, and by so doing prevent the clogging of the center of the machine, on account of the gathering of cuttings or coal-dust within the carriage and stationary bed. The knives or cutters $p$ on the bar are secured in place by means of their tangs $p'$, which pass through holes in the bars, and are secured thereto by nuts screwing on the ends of the tangs and against the opposite face of the bar, and these cutters $p$ are placed at suitable intervals around the bar in such position that the end of one cutter comes opposite the end of the adjacent cutter, and while one cutter cuts away the coal in its course as the bar is fed forward the next cutter cuts away the coal along the edge of the course of the first cutter, the cutters on the bar thus acting to remove all the coal in the course of the bar. The cutters are disposed in this manner on the different faces of the bar and act to cut away all the coal in the course of the bar, except where the drive-chains operate and where the bearings $l$ are placed, the coal opposite the bearings being broken away by the chisel-faces $l^3$ of the bearings, while the drive-chains carry the cutters, as hereinafter described, and cut away the coal in the course of their movement. As the bar is twisted in the manner above described, it is evident that these cutters, being disposed at intervals in the form of a screw extending back from the center of the bar, will act to force the coal toward the outer ends of the carriage, and thus relieve the center of the carriage from the large mass of cuttings which have heretofore been found to gather within the carriage of the machine, and which are exceedingly hard to remove. The twisted form of the bar itself also causes it to act in the same manner as a spiral conveyer within a box and force the cuttings out toward the ends of the bar.

In the machines as heretofore constructed the cutter-bar or tool has been generally driven by a single chain extending from the drive-shaft $k$ in the center of the machine forward to the cutter-bar, this chain being operated by suitable sprockets on the driving-shaft and cutter-bar. We have found that by this construction heavy strain is brought upon the chains employed and upon the bearings of the cutter-bar, often causing the breaking of the parts, and to overcome this we have arranged the machine with four sets of drive-chains—two within the carriage and two outside the frame—and have thus not only relieved the cutter-bar and its bearings of this heavy strain, but found that the cutter-bar worked with less friction, and such heavy strain on a single chain has been overcome. The drive-chains operate not only to turn the cutter-bar, but also to carry back the cuttings to a point from which they can be removed. We have also provided the drive-chains with cutters at intervals thereon, and have thereby overcome the necessity of breaking away a portion of the coal opposite the chain, or of providing the cutter-bar with knives working within the chain, such devices being very liable to become clogged, and thus prevent the easy operation of the apparatus, the chains thus acting to rotate the cutter-bar, cut a path for themselves in the coal, and to carry back the cuttings. In order to accomplish this the drive-shaft $k$ extends out beyond the carriage-frame at the end of the upright plates $f$, the drive-shaft being raised sufficiently to extend above the stationary frame, as shown in Figs. 2 and 4. On the drive-shaft within the carriage are the sprocket-wheels $k^2$, and at each end of the drive-shaft outside of the carriage are the sprocket-wheels $k^3$. Opposite these sprocket-wheels on the cutter-bar L are corresponding sprocket-wheels, $r$, and extending from the sprocket-wheels on the drive-shaft to those on the cutter-bar are the drive chains $s$, the chains preferably employed by us being what are termed "detachable drive chains," the chains being of a construction well known, their exact construction being fully shown in the drawings. The links in the chains correspond substantially to the width of the cutter-bar and fit around it, as shown, and the sprockets $r$ on the wheels fit up in the spaces of the chains. The chains thus act to carry the power from the drive-shaft $k$ to the cutter-bar and rotate the same.

At suitable intervals in the drive-chains are employed links carrying knives or cutters $s'$, every third link being provided with one of these cutters, and the cutters $s'$ are the full width of the chain, so that they cut a swath or path the full width required therefor. These chains pass forward above the cutter-bar and backward below the same, and the chains and their cutters in their backward course act to clean away or draw back the cuttings, and in that way to leave a free course for the forward movement of the carriage, and thus do away with the necessity of separate cleaner-chain apparatus.

The operation of the machine is as follows: The mining-machine is provided with suitable jacks or other apparatus for securing it in place, these jacks being secured to the stationary bed, so that it may be secured in place and held firmly during the cutting operation. When the bed has been secured in place, the apparatus is set in motion and run at a high speed, the engine shaft being generally rotated at a speed of about two hundred revolutions per minute. The clutches $i^2$ are thrown into connection with the worm-gear $i'$ connecting the longitudinal shafts $i$ with the apparatus for feeding forward the traveling carriage. The engine-shaft, through the gearing $g^4$, $h'$, $h^2$, and $k'$, rotates the feeding-shaft $k$, and this feeding-shaft, through sprockets $k^2$ and $k^3$ and driving-chains $s$, rotates the cutter-bar $l$, the cutter-bar being thus rotated at a high speed. At the same time the apparatus, through the single-thread screws $h^3$ and the screw gears $i'$ on the longitudinal shaft $i$, screws $m$, and screw-rack $m'$, feeds the carriage forward slowly, the knives or cutters $p$ on the cutter-bar and the knives or cutters $s'$ on the chains cutting away the coal, while the wedge-faces $l^2$ on the bearing break away the thin walls of coal in front of the bearings $l$, and the machine thus cuts under the coal, channeling out the coal gradually as the machine is fed forward. On account of the twisted form of the cutter-bar, and the position of the knives or cutters thereon, they force the coal-dust or cuttings toward the outer ends of the carriage-frame, where the drive-chains, running on the outside of the frame, carry back this coal, thus cleaning away the cuttings and carrying them back to a place from which they can be removed. At the same time any cuttings passing between the side bars of the frame are carried back by the drive-chains within the frame to a point from which they can be removed, the apparatus continuing to cut away or channel out the coal and to carry back the cuttings as the carriage is fed forward until the apparatus is fed cut its entire distance, the usual cut being about five feet in length and about four feet in width. As soon as the cut is made, the operator, by means of the levers, disengages the clutches $i^2$ from the screw-gears $i'$ and causes them to engage with the screw-gears $n^3$, when, through the gearing $g^4$ $h'$ $n'$, the recede-shaft $n$, the double-thread worms $n^2$, and the screw-gears $n^3$, the longitudinal shafts $i$ are turned in the opposite direction, and through the screws $m$, working in the screw-racks $m'$, cause the withdrawal of the carriage, the chains and cutter-shaft being turned continuously in the one direction, and carrying back with them any cuttings which have not been carried back by the chains during the feeding operation of the machine. The apparatus is then moved along a sufficient distance to bring it opposite the next cut to be made, when the operation before described is repeated. As the carriage-frame is supported on the friction-rollers $d^2$, running on the track $a^4$ in the stationary bed, and any upward pressure of the carriage comes against the friction-rollers $c$ on the stationary bed where it extends above the side bars, $d'$, of the carriage, it is evident that there is but little friction between the carriage and stationary bed in the longitudinal movement of the carriage backward and forward, friction being reduced in this manner to such an extent as to reduce the force necessary to operate the apparatus several horse-power. The friction between the cutter-bar L and its bearings $l$ is also greatly reduced through the idle-rollers within the boxes or bearings $l$, so that the power necessary to rotate the bars is also greatly reduced. The gearing employed is simple in construction, and can be made heavy and strong. As the machine is fed forward and back by means of the screw-gear, it is evident that a positive feed and recede is obtained which is not so liable to fracture as where the ordinary cog-gearing is employed. As the cuttings are forced by means of the twisted cutter-bar toward the outer ends of the carriage-frame, it is evident that there is not the liability of the apparatus choking on account of the packing of the cuttings, which has heretofore been found difficult to overcome in the machines as heretofore constructed. As all the apparatus necessary to operate the separate cleaner-chains is done away with, it is evident that in this way the power necessary to operate the machine is further reduced, and as the power is communicated to the cutter-bar at four different points the strain on the cutter-bar and on each of the bearings is overcome to a great extent.

What we claim as our invention, and desire to secure by Letters Patent, is—

1. In mining-machines, the combination of the stationary bed having side portions provided with tracks, and the traveling carriage carrying rotary cutting apparatus, and having longitudinal bars fitting within the side portions of the bed and provided with rollers mounted in slots in said bars and traveling on said tracks, substantially as and for the purposes set forth.

2. In mining-machines, the combination of the stationary bed having the side portions, $a$, provided with horizontal plates $a^3$, carrying rollers $c$, and the traveling carriage carrying rotary cutting apparatus and having the bars $d$, fitting in said side portions, $a$, and provided with side bars, $d'$, extending under said plates $a^3$, and rollers $c$, substantially as and for the purposes set forth.

3. In mining-machines, the combination of the stationary bed having the side portions, $a$, provided with the track $a^4$, and carrying rollers $c$, the traveling carriage carrying rotary cutting apparatus and having longitudinal bars $d$, provided with side bars, $d'$, extending under said rollers $c$, and the rollers $d^2$, mounted in said bars $d$ and traveling on said tracks $a^4$, substantially as and for the purposes set forth.

4. In mining-machines, the combination of the stationary bed having the screw-rack $m'$, the carriage traveling thereon and carrying rotary cutting apparatus, the longitudinal shaft $i$, mounted in the carriage and having the screw $m$, meshing in said screw-rack, the screw-gear $i'$ on said shaft $i$, the transverse shaft $h$, carrying the screw $h^3$, meshing with said screw-gear $i'$, the power-shaft, and connections between the same and the transverse shaft, substantially as and for the purposes set forth.

5. In mining-machines, the combination of the stationary bed having the screw-rack $m'$, the carriage traveling thereon and carrying rotary cutting apparatus, the horizontal shaft mounted in the carriage and having the screw $m$, meshing in said screw-rack, the screw-gears $i'$ and $n^3$, mounted on said shaft $i$, the transverse shafts $h$ and $n$, carrying screws $h^3$ and $n^2$, meshing with said screw-gears $i$ and $n^3$, respectively, clutch apparatus, the power-shaft, and connections between the same and said transverse shafts, substantially as and for the purposes set forth.

6. In mining-machines, the combination of the stationary bed, the carriage traveling thereon and carrying rotary cutting apparatus, said carriage having the engine-shaft $g$, feed-shaft $h$, recede-shaft $n$, gearing $g^4 h' n'$, and means for imparting longitudinal motion to said carriage from said feed-shaft and recede-shaft, respectively, substantially as and for the purposes set forth.

7. In mining-machines, the combination of the traveling carriage carrying the cutter-tool at its forward end, the driving-shaft extending beyond the carriage-frame, and drive-chain connections between the driving-shaft and cutting-tool outside of the carriage-frame, substantially as and for the purposes set forth.

8. In mining-machines, the combination, with the traveling carriage, of the drive-shaft, the cutting-tool having a series of cutters, and the combined driving, cutting, and cleaning chains mounted on said shaft and tool within and outside of the carriage-frame, substantially as and for the purposes set forth.

In testimony whereof we, the said SAMUEL B. STINE and JAMES V. SMITH, have hereunto set our hands.

SAMUEL B. STINE.
JAMES V. SMITH.

Witnesses:
A. R. TITZINGER,
GEO. H. WOODEN.